US007359913B1

(12) United States Patent
Ordonez

(10) Patent No.: US 7,359,913 B1
(45) Date of Patent: Apr. 15, 2008

(54) K-MEANS CLUSTERING USING STRUCTURED QUERY LANGUAGE (SQL) STATEMENTS AND SUFFICIENT STATISTICS

(75) Inventor: Carlos Ordonez, San Diego, CA (US)

(73) Assignee: NCR Corp., Dayton, OH (US)

( * ) Notice: Subject to any disclaimer, the term of this patent is extended or adjusted under 35 U.S.C. 154(b) by 354 days.

(21) Appl. No.: 11/129,732

(22) Filed: May 13, 2005

(51) Int. Cl.
*G06F 17/30* (2006.01)
*G06F 17/00* (2006.01)
(52) U.S. Cl. .......................................... 707/102; 707/4
(58) Field of Classification Search ................ 706/45; 707/1, 3, 5, 6, 102; 714/37
See application file for complete search history.

(56) References Cited

U.S. PATENT DOCUMENTS

| | | | |
|---|---|---|---|
| 6,012,058 | A | 1/2000 | Fayyad et al. |
| 6,374,251 | B1 | 4/2002 | Fayyad et al. |
| 6,496,834 | B1 | 12/2002 | Cereghini et al. |
| 6,519,591 | B1 | 2/2003 | Cereghini et al. |
| 6,567,936 | B1 * | 5/2003 | Yang et al. ................. 714/37 |
| 6,581,058 | B1 | 6/2003 | Fayyad et al. |
| 6,615,205 | B1 * | 9/2003 | Cereghini et al. ............. 707/3 |
| 6,741,983 | B1 * | 5/2004 | Birdwell et al. .............. 707/5 |
| 6,816,848 | B1 | 11/2004 | Hildreth et al. |
| 6,862,586 | B1 * | 3/2005 | Kreulen et al. .............. 707/3 |
| 2003/0097352 | A1 * | 5/2003 | Gutta et al. .................. 707/1 |
| 2005/0160073 | A1 * | 7/2005 | Bernhardt et al. ............ 707/1 |
| 2006/0218132 | A1 * | 9/2006 | Mukhin et al. ............... 707/4 |

OTHER PUBLICATIONS

IBM Technical Disclosure Bulletin, Mar. 1992, US, vol. 34, Issue 10B, pp. 351-352.*
R. Agrawal, et al., "Fast Algorithms for Projected Clustering," ACM SIGMOD Conference, pp. 61-72 (1999).
R. Agrawal, et al., "*Fast Algorithms for Mining Association Rules*" ACM SIGMOD Conference, pp. 1-32 (1999).
C. Aggarwal, et al., "*Finding generalized projected clusters in high dimensional spaces*" ACM SIGMOD Conference, p. 1-12 (2000).
R. Agrawal, et al., "*Automatic Subspace Clustering of High Dimensional Data for Data Mining Applications*" ACM SIGMOD Conference, pp. 1-12 (1998).
R. Agrawal, et al., "*Mining Association Rules Between Sets of Items in Large Databases*" ACM SIGMOD Conference, pp. 1-10 (1993).
P.S. Bradley, et al., "*Scaling Clustering Algorithms to Large Databases*" ACM KDD Conference, pp. 1-7 (1998).
M. M. Breunig, et al., "*Data Bubbles: Quality Preserving Performance Boosting for Hierarchical Clustering*" ACM SIGMOD Conference, pp. 1-12 (2001).
F. Farnstrom, et al., "Scalability for Clustering Algorithms Revisited" SIGKDD Explorations, 2(1):1-7 (Jul. 2000).

(Continued)

*Primary Examiner*—Pierre Vital
*Assistant Examiner*—Christopher P Nofal
(74) *Attorney, Agent, or Firm*—Trop, Pruner & Hu P.C.

(57) ABSTRACT

A database includes a storage to store a data set and a controller to use one or more SQL (Structured Query Language) statements to perform computations associated with a clustering algorithm e.g., a K-means clustering algorithm).

22 Claims, 2 Drawing Sheets

OTHER PUBLICATIONS

B. Fritzke, "The LBG-U method for vector quantization—an improvement over LBG inspired from neural networks" Neural Processing Letters, 5(a):1-9 (1997).

V. Ganti, et al., "CACTUS—Clustering Categorical Data Using Summaries" ACM KDD Conference, pp. 1-11 (1999).

S. Guha, et al., "Clustering Data Streams" FOCS, pp. 1-8 (2000).

S. Guha, et al., "CURE: An Efficient Clustering Algorithm for Large Databases" SIGMOD Conference, pp. 1-10 (1998).

S. Guha, et al., "ROCK: A Robust Clustering Algorithm for Categorical Attributes" ICDE Conference, pp. 345-352 (2000).

J. Han, et al., "Mining frequent patterns without candidate generation" ACM SIGMOD Conference, pp. 1-3 (2000).

A. Hinneburg, et al., "Optimal Grid-Clustering: Towards Breaking the Curse of Dimensionality in High-Dimensional Clustering" VLDB Conference, pp. 1-12 (1999).

L. O'Callaghan, et al., "Streaming-Data Algorithms For High-Quality Clustering" IEEE ICDE, pp. 1-25 (2001).

C. Ordonez, et al., "FREM: Fast and robust EM clustering for large data sets" ACM CIKM Conference, pp. 1-12 (2002).

C. Ordonez, et al., "A Fast Algorithm to Cluster High Dimensional Basket Data" IEEE ICDM Conference, pp. 1-4 (2001).

S. Roweis, et al., "A Unifying Review of Linear Gaussian Models" Neural Computation, pp. 305-345 (1999).

M. Sato, et al., "On-line EM Algorithm for the Normalized Gaussian Network" Neural Computation 12(2), pp. 1-24 (2000).

T. Zhang, et al., "BIRCH: An Efficient Data Clustering Method for Very Large Databases" ACM SIGMOD Conference, pp. 103-114 (1996).

P.S. Bradley, et al, "Refining Initial Points for K-Means Clustering" 15th Int'l Conf. On Machine Learning, pp. 91-99 (1998).

C. Ordonez, "Clustering Binary Data Streams with K-Means" 8th ACM SIGMOD Workshop DMKD 2003, pp. 12-19 (Jun. 13, 2003).

C. Ordonez, U.S. Appl. No. 10/838,475, entitled "Method and Apparatus to Cluster Binary Data Transactions," filed May 4, 2004, pp. 1-26, Figs. 1-3.

D. Papadopoulos et al., "Clustering Gene Expression Data in SQL Using Locally Adaptive Metric," Presented at DMKD03: 8th ACM SIGMOD Workshop on Research Issues in Data Mining and Knowledge Discovery, 2003, pp. 35-41.

C. Ordonez et al., "SQLEM: Fast Clustering in SQL using the EM Algorithm," ACM SIGMOD Conference, pp. 559-570 (2002).

C. Ordonez, "Fast K-means Clustering in SQL based on Improved Distance Computation and Sufficient Statistics," KDD, pp. 1-11 (Aug. 2004).

* cited by examiner

K-MEANS CLUSTERING USING STRUCTURED QUERY LANGUAGE (SQL) STATEMENTS AND SUFFICIENT STATISTICS

BACKGROUND

Various types of database technologies exist, include relational database technologies, hierarchical database technologies, and other types of database technologies. A relational database includes a set of inter-related tables that contain rows and columns. An application of database systems is data warehousing, where data from various sources are collected and stored in the data warehouse. The amount of data that can be stored in a data warehouse can be immense.

For better understanding of data contained in a data warehouse or other database, data mining is performed with respect to the data warehouse or database. As part of data mining, automated statistical analysis is often performed. One of the tasks performed in statistical analysis is clustering, which involves segmentation, classification, and anomaly detection of data in a data warehouse or other database.

During clustering, a data set is partitioned into disjoint groups such that points in the same group are similar to each other according to some similarity metric. A widely used clustering technique is K-means clustering. Clustering can be performed on numeric data or categorical data. Numerical data refers to data that can be assigned a metric measure, such as height, scale, volume, and so forth. Categorical data is data that has a finite number of values not represented by a measure. Examples of categorical data include city, state, gender, and so forth.

Normally, K-means clustering algorithms are relatively difficult to implement in database management systems. A programmer that develops code for clustering algorithms typically has to address issues such as storage management, concurrent access, memory leaks, false alarms, security concerns, and so forth. Such complexity results in lengthy development times for clustering algorithm code. Also, it is usually quite difficult to implement K-means clustering in a database system using generic programming languages such as C++ or Java.

SUMMARY

In general, clustering (e.g., K-means clustering) of data in a database system is performed using an optimized clustering technique based on Structured Query Language (SQL) statements.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Database System Environment

Figure 1:
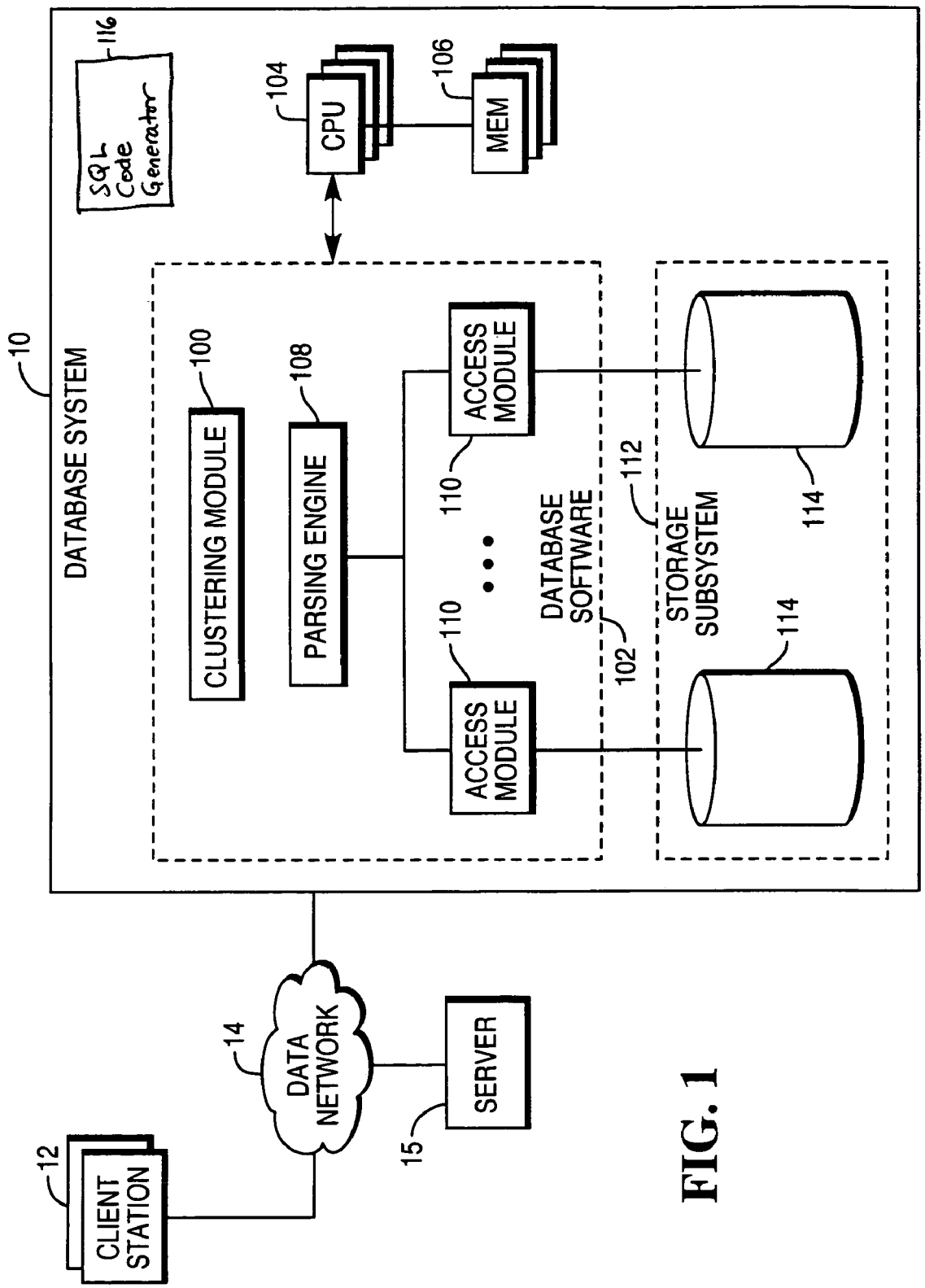
FIG. 1 is a block diagram of an example arrangement that includes a database system coupled to one or more client stations, where the database system has a clustering mechanism according to some embodiments of the invention.

FIG. 1 illustrates an example arrangement of a database system 10 (e.g., a relational database management system) that includes a clustering module 100 capable of performing clustering techniques according to some embodiments. In some implementations, the clustering techniques include K-means clustering techniques. In the ensuing description, reference is made to K-means clustering. However, it is contemplated that techniques according to some embodiments are applicable to other types of clustering.

The clustering module 100, in the illustrated embodiment, is part of database software 102 that is executable on one or more central processing units (CPUs) 104 in the database system. The one or more CPUs 104 are connected to memories 106. According to some embodiments, the clustering module 100 is part of a clustering mechanism that performs K-means clustering using Structured Query Language (SQL) statements, including SQL data manipulation language (DML) statements and/or data definition language (DDL) statements. The clustering module 100 executes clustering actions specified in SQL statements. The SQL statements for performing actions relating to clustering are generated by an SQL code generator 116 according to an embodiment. Alternatively, the SQL statements for performing clustering actions can be implemented in a stored procedure or by some other mechanism.

Performing K-means clustering using SQL statements according to some embodiments simplifies the implementation of K-means clustering algorithms in a database system. For example, by using SQL statements to perform clustering actions, the relational database structure does not have to be changed, which may be needed if K-means clustering is implemented using C++, Java, or other generic programming languages. Also, in accordance with some embodiments, K-means clustering can be implemented using existing SQL syntax, such that extensions to SQL do not have to be defined, which further enhances efficiency and simplification.

The clustering module 100 is invoked to cluster a data set, which can either be located in one or more tables in the database system 10 or be provided as a flow or stream of input data to the database system 10. In one implementation, data associated with transactions are loaded by client stations 12 over a data network 14 to a server 15. The clustering module 100, when invoked, accesses the server 15 in one of several ways: by accessing disk blocks on the server directly; or by transferring data on a channel where rows are being loaded.

The database software 102 also includes one or more parsing engines 108 and access modules 110. The database system 10 in accordance with one embodiment of the invention is a parallel database system that includes multiple access modules 110 for concurrent access of data stored in a storage subsystem 112. The storage subsystem 112 includes plural storage modules 114 that are accessible by respective access modules 110.

Each access module 110 is capable of performing the following tasks: insert, delete, or modify contents of tables stored in respective storage modules 114; create, modify or delete the definitions of tables; retrieve information from definitions and tables; and lock databases and tables. The clustering module 100 and other applications or users can share the same set of tables. In one example, the access modules 110 are based on access module processors (AMPs) used in some TERADATA® database systems from NCR Corporation.

The parsing engine 108 in the database software 102 includes a parser that receives queries (e.g., SQL queries), including queries to perform clustering actions. The queries can be received from another program over some type of connection or through an established session (such as from a client station 12 to the database system 10). A selected access or query plan for each received query contains steps that are to be performed by the access modules 110. In response to these steps, the access modules 110 perform operations on data or data structures (e.g., tables, views, and so forth) stored in the storage modules 114 in the storage subsystem 112. If the performance of clustering is desired, then the clustering module 100 cooperates with the access modules 110 to perform the clustering. Note that multiple instances of the clustering module 100 can be provided for respective multiple access modules 110.

II. Definitions of Data Structures for K-Means Clustering

The inputs to the K-means clustering module 100 are: (1) a data set Y having n d-dimensional points, $Y=\{y_1, y_2, \ldots, y_n\}$, and (2) k, the desired number of clusters. Each $y_i$, $i=1, \ldots, n$, is a point in the data set Y. Note that Y is a data set having dimensions n×d. A d-dimensional point refers to a vector or array having d dimensions. For example, each d-dimension point can be part of a transaction that has d attributes. In some implementations, there exists a table Y with multiple numerical columns out of which d columns are picked for clustering analysis. In practice, the input table may have many more than d columns, but to simplify exposition, the definition of Y is $(Y_1, Y_2, \ldots, Y_d)$. Note that $Y_1, Y_2, \ldots, Y_d$ differ from $y_1, y_2, \ldots, y_n$, introduced earlier. Each $Y_l$, $l=1$ to d, represents a column of Y, whereas each $y_i$, $i=1$ to n, represents a row of Y.

The output of the K-means clustering module 100 includes three matrices: C (containing the means or probability of occurrence of each dimension in each cluster), R (containing squared distances), and W (containing the weights for each cluster). The output produce by the clustering module 100 also includes a partition of Y into k subsets and a measure of cluster quality. Matrices C and R are d×k matrices and matrix W is a k×1 matrix. The W matrix thus includes k weights, the C matrix includes k means, and the R matrix includes k variances.

In the following discussion, for manipulating matrices, the following convention for subscripts is used. When referring to transactions, the variable i is used, where $i \in \{1, 2, \ldots, n\}$. For cluster number, the variable j is used, where $j \in \{1, 2, \ldots, k\}$. Also, reference is made to variable l, where $l \in \{1, 2, \ldots, d\}$. $X_1, X_2, \ldots, X_k$ refer to the k subsets of the data set Y induced by clusters such that $X_j \cap X_{j'} = \emptyset \neq j'$. To refer to a column of C or R, the j subscript (e.g., $C_j, R_j$) is used. $C_j$ and $R_j$ refer to the jth cluster centroid and jth variance matrix, respectively, and $W_j$ is the jth cluster weight.

III. A K-Means Clustering Algorithm

Formally, the problem of clustering is defined as finding a partition of Y into k subsets (clusters) such that $$\sum_{i=1}^{n} d(y_i, C_j) \qquad \text{(Eq. 1)}$$

is minimized, where $d(y_i, C_j)$ indicates the distance from point $y_i$ to $C_j$, and where $C_j$ is the nearest cluster centroid of $y_i$. The quality of a clustering model is measured by the sum of squared distances from each point to the cluster where the point was assigned. This quantity is proportional to the average quantization error, also known as distortion. The quality of a solution is measured as:

$$q(C) = \frac{1}{n}\sum_{i=1}^{n} d(y_i, C_j), \qquad \text{(Eq. 2)}$$

where $y_i \in X_j$.

Figure 2:
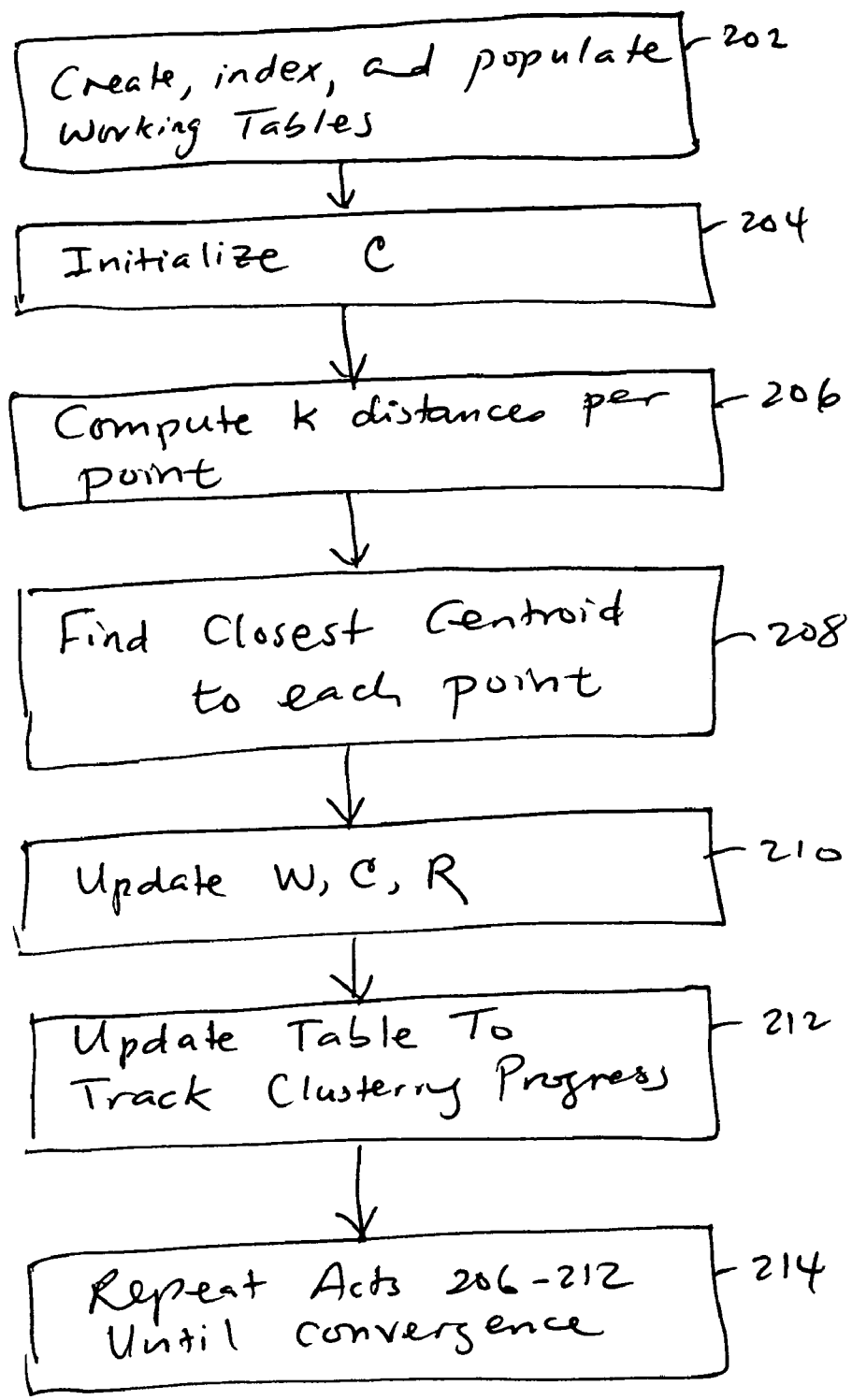
FIG. 2 is a flow diagram of a process of clustering a data set according to an embodiment in the database system of FIG. 1.

FIG. 2 illustrates generally the tasks involved in performing K-means clustering. The tasks can be performed by the clustering module 100 or by the clustering module 100 in combination with other modules. Initially, working tables are created, indexed, and populated (at 202). The working tables include various intermediate tables used for calculating Euclidean distances, finding nearest centroids, and updating the C, R, and W matrices (described further below). The centroids $C_j$ are initialized (at 204) with k points randomly selected from the data set Y for an approximation. Initializing the centroids allows multiple iterations of the clustering computations to be performed to converge to a solution. Each iteration assigns each point to its nearest cluster and then points belonging to the same cluster are averaged to get new cluster centroids. Each iteration successively improves cluster centroids until they become stable.

The clustering algorithm computes (at 206) k distances for each data point $y_i$. The K-means clustering algorithm calculates Euclidean distances to enable the finding of the nearest centroids to each input point. The distance from input point $y_i$ to $C_j$ (jth cluster centroid) is $$d(y_i, C_j) = (y_i - C_j)^T (y_i - C_j) = \sum_{l=1}^{d}(y_{li} - C_{lj})^2. \qquad \text{(Eq. 3)}$$

Using the computed distances, the clustering algorithm then finds (at 208) the closest centroid $C_j$ to each data point $y_i$. Finding the closest centroid for each data point effectively determines the nearest cluster for each data point so that the data point can be added to that nearest cluster. Cluster membership is determined in this manner so that the data set Y can be partitioned into k subsets (corresponding to the k clusters).

The clustering algorithm then updates (at 210) the W, C, and R matrices. All centroids $C_j$ are updated by averaging points belonging to the same cluster. The k cluster weights $W_j$ and the k diagonal variance matrices $R_j$ are updated based on the updated $C_j$ centroids.

For enhanced efficiency, the computations for performing clustering actions (206, 208, 210) are performed based on SQL code (including SQL statements), described in greater detail further below. As noted above, in some implementations, the SQL code is generated by the SQL code generator 116 (FIG. 1). In other implementations, the SQL code is included in a stored procedure or provided by some other mechanism. The SQL code can be automatically generated by the SQL code generator 116 based on the input table Y with d columns, and the input k (number of clusters).

By performing clustering actions using SQL code, a programmer does not have to explicitly develop code to address system hardware and/or software issues, such as storage management, concurrent access, memory leaks, false alarms, security concerns, and so forth. As a result, clustering algorithms can be more efficiently implemented by developing the SQL code generator 116 (FIG. 1) for generating SQL code for performing clustering actions, or otherwise creating the SQL code automatically.

After updating of the W, C, and R matrices, the clustering module updates (at 212) a table that tracks K-means progress. The acts 202-212 are repeated (at 214) until the K-means solution converges. In other words, the K-means algorithm stops when q(C) (see Eq. 2 above) changes by less than or equal to a marginal fraction ($\epsilon$), a predefined value, in consecutive iterations. Alternatively, a maximum number of iterations can be set to avoid long runs. The acts discussed above are explained in further detail below.

The following describes in greater detail the use of SQL statements to build intermediate tables as part of the table population act (202) of FIG. 2. These intermediate tables are used in clustering actions. The SQL-based clustering technique builds a "horizontal" table with d+1 columns: YH (i, $Y_1, Y_2, \ldots, Y_d$) having i as primary key. The first column is the i subscript for each point, and the remaining columns of YH include the lists ($Y_l$, l=1, . . . , d) of d dimensions. Use of table YH may reduce input/output (I/O) access operations (as compared to use of input table Y) since YH may have fewer columns than Y (note that Y may have many columns of which only d are selected for clustering analysis). The table YH is scanned several times during the clustering analysis so that fewer columns means less I/O access operations.

In general, the index i (point identifier) may not exist because the primary key of Y may include more than one column, or the primary key may not exist at all because Y is the result of some aggregation. Therefore, if i does not exist, then i is automatically created to provide a unique identifier for each point $y_i$. The following statement computes a cumulative sum on one scan over Y to get i$\epsilon$\{1 . . . n\} and projects the desired d columns from the input table Y.

INSERT INTO YH
SELECT SUM (1) over(rows unbounded preceding) AS i, $Y_1, Y_2 \ldots, Y_d$
FROM Y;

The value of i, created in the SQL statement above, basically increments for each successive row of YH. The point identifier i can alternatively be generated with some other SQL function that returns a unique identifier for each point.

Clustering results are stored in matrices W, C, R. One technique for storing the matrix results is to build all of the following tables: W(j, w), C(l, j, val), R(l, j, val), having k, d·k and d·k rows respectively. Note the distinction between a table and matrix. A table is a relational data structure of the database system, whereas a matrix is a data structure that can be stored in a table. For enhanced efficiency, instead of building three separate tables, one table WCR(l, j, W, C, R) is defined according to some embodiments. The table WCR is used in conjunction with a sufficient statistics technique, described further below, for updating the W, C, and R matrices (which are contained in the WCR table).

Although the table YH defined above is useful to seed (initialize) the K-means algorithm, the table YH is not adequate to compute distances using the SQL "SUM( )" aggregate function. To enable distance computation using the "SUM( )" aggregate function, the table YH is transformed into a "vertical" (or pivoted) table having d rows (instead of n rows for the YH table) for each input, with one row per dimension. This leads to table YV with definition YV(i, l, val). The table YV is populated with d SQL statements as follows:

INSERT INTO YV SELECT i,1, $Y_1$ FROM YH;
. . .
INSERT INTO YV SELECT i,d, $Y_d$ FROM YH;

Effectively, the series of INSERT statements above cause columns $Y_l$, l=1 to d, to be inserted into rows of table YV as the val column.

Optionally, another intermediate table is defined (at 202) to store several useful numbers to track K-means progress. Such a table can be named MODEL:

MODEL(d,k,n, iteration, avg_q, dif f_avg_q), where iteration indicates the number of iterations of the clustering algorithm, avg_q indicates the average quality of the clustering solution, and dif f_avg_q indicates a difference of quality of solutions in consecutive iterations of the clustering algorithm. Convergence of the clustering algorithm is detected once dif f_avg_q equals or drops below the predefined value $\epsilon$.

To initialize (or seed) the matrix C (at 204), k points can be randomly selected from table Y to place in matrix C. Since the matrices W and R are output matrices, the W and R matrices do not have to be initialized. YH can be used to seed a "horizontal" version of C, referred to as table CH. Table CH(j, $Y_1, \ldots, Y_d$) is updated as follows:

INSERT INTO CH
SELECT 1, $Y_1, \ldots, Y_d$ FROM YH SAMPLE 1;
. . .
INSERT INTO CH
SELECT k, $Y_1, \ldots, Y_d$ FROM YH SAMPLE 1;

Each of the above statements selects the columns of a sample of the YH table, including the index i and the remaining columns. The clause YH SAMPLE 1 obtains a row from the table YH. In the series of SQL statements above, k sample rows are obtained from YH to populate CH. The content of table CH is used to initialize the matrix C by taking k random points from CH (act 204 of FIG. 2).

For K-means, the most processing-intensive task (involving heavy CPU and I/O use) is distance computation (act 206 in FIG. 2). According to some embodiments, distance computation can be optimized to decrease I/O accesses. In some conventional clustering techniques, distance computation involves joining one table having d·n rows with another table having d·k rows to produce a large intermediate table with d·k·n rows. Once this intermediate table is computed, the conventional clustering technique groups rows of the intermediate table into d·k groups. However, according to some embodiments, the creation of such a large intermediate table having d·k·n rows is avoided. Clustering techniques according to some embodiments are able to compute the k distances per point while avoiding this large intermediate table.

Also, in conventional clustering techniques, the determination of the nearest cluster given k distances for i$\epsilon$1 . . . n, involves scanning a table having k·n rows, to get the minimum distance per point, and then a join (of a table having k·n rows with another table having n rows) to determine the subscript of the closest cluster.

To reduce I/O accesses, the clustering algorithm according to some embodiments computes the k distances in a single database access operation and stores them as k columns of a table YD. The table YD is defined as YD (i, $d_1$, $d_2$, ..., $d_k$) with primary key i, where $d_j$=d($y_i$, $C_j$), the distance from point i to the jth centroid. This table YD, having n rows and k columns, enables decreased I/O since disk space is reduced (less space per row due to index on n rows instead of k·n rows), and the k distances per point can be obtained in one I/O access instead of k I/O accesses. The representation of matrix C is changed to have all k values per dimension in one row or equivalent, containing one cluster centroid per column, to enable efficient computation of distances. This leads to a join producing a table with only n rows instead of k·n rows, and creating an intermediate table with d·n rows instead of d·k·n rows.

A table C (to store matrix C) is defined as C (l, $C_1$, $C_2$, ..., $C_k$), with primary key l. At the beginning of each iteration, column $C_j$ is copied from a table WCR to table C. Table C is separately created for efficiency purposes for later access (in the SQL statement below), since table C has a smaller number of rows than table WCR.

The SQL statement to compute the k distances (206 in FIG. 2) is as follows:
   INSERT INTO YD
   SELECT i
   ,SUM((YV.val−C.$C_1$)**2) AS $d_1$
   ...
   ,SUM((YV.val−C.$C_k$)**2) AS $d_k$
   FROM YV,C WHERE YV.l=C.l GROUP BY i;

Each dimension of each point in the table YV is paired with the corresponding centroid dimension $CC_j$. This join is efficiently handled by the query optimizer because YV is large and C is small. Alternatively, if user-defined functions or routines are used, then the clustering algorithm uses a different distance user-defined function for each value of d, or a function allowing a variable number of arguments (e.g., the distance between $y_i$ and $C_j$ would be distance ($y_{1i}$, $C_{1j}$, $y_{2j}$, $C_{2j}$, ..., $y_{di}$, $C_{dj}$).

Because all k distances are in one row of the table YD, the SQL MIN( ) aggregate function cannot be used to find the minimum distance. To determine the nearest cluster (act 208 of FIG. 2), a CASE statement is used instead of calling the MIN( ) aggregate function. In this case, the SQL statement to obtain the subscript of the closest centroid is:
   INSERT INTO YNN SELECT i,
   CASE
   WHEN $d_1 \leq d_2$ AND $d_1 \leq d_k$ THEN 1
   WHEN $d_2 \leq d_3$ AND $d_2 \leq d_k$ THEN 2
   ...
   ELSE k
   END FROM YD;

The table YNN has n rows with each row containing index i and a value indicating the nearest centroid for the corresponding point of Y.

In the above SQL statement, it is evident that there is no join needed and the search for the closest centroid for one point can be performed in main memory (thus avoiding costly I/O accesses to persistent storage). The nearest centroid is determined in one scan of YD. The I/O is reduced from (2·k·n+n) I/O accesses to n I/O accesses. Observe that the jth WHEN predicate in the SQL statement above has k−j terms. In other words, as the search for the minimum distance continues, the number of inequalities to evaluate decreases. However, the CASE statement has time complexity $O(k^2)$ instead of $O(k)$, which is the usual time to determine the nearest centroid. This may adversely affect K-means performance from a theoretical point of view. But I/O is the main performance factor and this CASE statement works in memory. If k is more than the maximum number of columns allowed in the database system, YD and C can be vertically partitioned to overcome this limitation. The above code can be simplified with a user defined function "ARGMIN( )" that returns the subscript of the smallest argument.

To improve efficiency and processing speeds, the K-means clustering algorithm according to some embodiments uses sufficient statistics. Sufficient statistics are summaries of $X_1$, $X_2$, ..., $X_k$ represented by three matrices M, Q, N. M (size d×k) contains a sum of points in each cluster, Q (size d×k) contains a sum of squared points in each cluster, and N (size k×1) contains a number of points per cluster. The sizes of N, M, Q are analogous to the sizes of W, C, R. The matrix Q represents a diagonal matrix analogous to $R_j$.

In accordance with some embodiments, the update of output matrices W, C, R (act 210 in FIG. 2) is enhanced by using sufficient statistics. As discussed above, $X_j$ represents the set of points in cluster j. Three new matrices N, M, Q are introduced to store sufficient statistics. Matrix N has dimensions k×1, and matrices M and Q have dimensions d×k. $N_j$ stores the number of points, $M_j$ stores the sum of points, and $Q_j$ stores the sum of squared points in cluster j, respectively. The values $N_j$, $M_j$, and $Q_j$ are calculated as follows:

$$N_j=|X_j|, M_j=\Sigma_{y_i \Delta X_j} y_i, \text{ and } Q_j=\Sigma_{y_i \Delta X_j} y_i y_i^T.$$

Based on these three equations, the matrices W, C, R are computed as $$W_j=N_j/\Sigma_{J=1}^k W_j, C_j=M_j/N_j, R_j=Q_j/N_j-C_j C_j^T$$

To update matrices N,M,Q, a join of YNN (that contains the partition of Y into k subsets) is performed with YV (that contains the actual dimension values). In accordance with some embodiments, instead of having three separate tables, N, M, Q are stored in the same table (referred to as NMQ). Keeping sufficient statistics in one table allows the clustering results to also be kept in one table (referred to as WCR). The following table definitions are introduced: NMQ(l, j, N, M, Q) and WCR(l, j, W, C, R). Both tables have the same structure and are indexed by the primary key (l, j). The SQL to update sufficient statistics is as follows:
   INSERT INTO NMQ SELECT
   l,j,SUM(1.0) AS N
   ,SUM(YV.val) AS M, SUM(YV.val*YV.val) AS Q
   FROM YV, YNN WHERE YV.i=YNN.i
   GROUP BY l,j;

The clause SUM(1.0) AS N effectively counts the number of points for storage in N. The clause SUM(YV.val) AS M computes sum points in YV for each cluster, and stores this sum in M. The clause SUM(YV.val*YV.val) AS Q computes the sum of squares of points and stores this sum in Q. By using one table NMQ, instead of three separate tables N, M, Q, the SQL code for updating W, C, R is simplified as follows:
   UPDATE WCR SET W=0;
   UPDATE WCR SET
   W=N
   ,C=CASE WHEN N>0 THEN M/N ELSE C END
   ,R=CASE WHEN N>0 THEN Q/N−(M/N)**2
   ELSE R END
   WHERE NMQ.l=WCR.l AND NMQ.j=WCR.j;
   UPDATE WCR SET W=W/MODEL.n;

The matrix W in table WCR is set to zero initially (SET W=0) because an SQL join automatically eliminates clusters with zero points. By setting W=0, clusters with zero points can still be shown in the outputs.

In the SQL statement above, the matrix W is set equal to N, the matrix C is set equal to M/N if N>0, and the matrix R is set equal to Q/N−(MIN)**2 if N>0. Also, the last UPDATE clause of the statement above updates W by setting it equal to W/MODEL.n, which produces the weight $W_j$ by dividing W by n.

In the SQL statement above for updating W, C, and R, only two tables NMQ and WCR are read, rather than six tables (N, M, Q, W, C, R). Reading fewer tables results in less I/O overhead.

Instead of using the UPDATE statement, an INSERT/SELECT statement could be used. However, use of an INSERT/SELECT statement would eliminate clusters with zero points from the output. There is some benefit to explicitly show the zero-point clusters, so that is the reason the UPDATE statement is used in some embodiments. A benefit of using sufficient statistics is that M and Q do not depend on each other and together with N they are enough to update C, R (eliminating the need to scan YV). Therefore, the dependence between C and R is removed and both can be updated at the same time. As a result, the improved K-means clustering algorithm does not require one scan over YNN to get W and two joins between YNN and YV to get C and R, which results in three scans over YNN and two scans over YV involving a read of (3·n+2·d·n row). By using sufficient statistics, the K-means clustering algorithm according to some embodiments requires only one join and one scan over YNN and one scan over YV (involving a read of n+d·n rows).

Table WCR is initialized with d·k rows having columns W, R set to zero and column C initialized with k random points taken from CH. At the beginning of each iteration of act 206 in FIG. 2, WCR.C is copied to table C so that table C is current.

Finally, to track K-means progress, the table MODEL is updated as follows:

UPDATE MODEL
FROM (SELECT SUM (W*R.val))AS avg_q
FROM R,W WHERE (R.j=W.j) avgR
SET avg_q=avgR.avg_q, iteration=iteration+1;

As noted above, avg_q indicates the average quality of the clustering algorithm, and iteration indicates the number of iterations of the clustering algorithm that have run.

Instructions of the various software routines or modules discussed herein (such as the SQL code generator 116 and database software 102, which includes the clustering module 100, access modules 110, and parsing engine 108, and so forth) are executed on corresponding CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. A database system comprising:
   a storage to store a data set; and
   a controller to:
      use a first Structured Query Language (SQL) statement to perform distance computation for a K-means clustering algorithm to partition the data set into plural clusters, wherein the first SQL statement selects plural distance values to output;
      execute the first SQL statement to output the plural distance values that correspond to the plural clusters; and
      use a second SQL statement to develop output matrices for the K-means clustering algorithm based on sufficient statistics matrices N, M, and Q stored in a table, wherein N contains numbers of points in corresponding clusters, M contains sums of points in corresponding clusters, and Q contains sums of square of points in corresponding clusters.

2. The database system of claim 1, wherein the first SQL statement specifies that the outputted plural distance values are stored in respective columns of a table.

3. The database system of claim 1, the controller to use a third SQL statement to find nearest centroids of corresponding clusters for data points in the data set based on the distance values.

4. The database system of claim 3, wherein the third SQL statement finds the nearest centroids for the data points without performing a join.

5. The database system of claim 3, wherein the third SQL statement finds the nearest centroids for the data points using CASE statements.

6. The database system of claim 1, further comprising an SQL code generator to generate the first and second SQL statements.

7. A database system comprising:
   a storage to store a data set; and
   a controller to:
      use a first Structured Query Language (SQL) statement to perform distance computation for a K-means clustering algorithm to partition the data set into plural clusters, wherein the first SQL statement selects plural distance values to output;

execute the first SQL statement to output the plural distance values that correspond to the plural clusters; and use a second SQL statement to develop output matrices for the K-means clustering algorithm based on sufficient statistics stored in a sufficient statistics table, wherein the sufficient statistics table contains N, M, and Q sufficient statistics matrices, wherein N contains numbers of points in corresponding clusters, M contains sums of points in corresponding clusters, and Q contains sums of square of points in corresponding clusters.

8. The database system of claim 7, wherein the controller is to use a third SQL statement to update the sufficient statistics table.

9. The database system of claim 8, wherein the second SQL statement sets content of the output matrices based on the sufficient statistics table.

10. The database system of claim 9, wherein the output matrices comprise W, C, and R output matrices, wherein W contains weights of corresponding clusters, C contains centroids of corresponding clusters, and R contains variances of corresponding clusters.

11. The database system of claim 9, wherein the second SQL statement updates content of an output table containing the output matrices.

12. The database system of claim 11, wherein the second SQL statement specifies a join of the sufficient statistics table and the output table.

13. An article comprising at least one storage medium containing instructions that when executed cause a system to:

develop a first Structured Query Language (SQL) statement to perform a K-means clustering based on sufficient statistics; and execute the first SQL statement to produce output for the clustering, the output generated based on the sufficient statistics, wherein the clustering identifies plural clusters, and wherein the sufficient statistics include an N matrix to store a number of data points for each cluster, an M matrix to store a sum of the data points for each cluster, and a Q matrix to store a sum of a square of the data points for each cluster, the N, M, and Q matrices being stored in a first table, wherein producing the output comprises producing the output based on the N, M, and Q matrices.

14. The article of claim 13, wherein the instructions when executed cause the system to develop a second SQL statement to compute the N, M, and Q matrices and to output the N, M, and Q matrices into the first table.

15. The article of claim 14, wherein the first SQL statement to perform clustering based on sufficient statistics computes output matrices of the clustering based on the first table.

16. The article of claim 13, wherein producing the output comprises producing a W matrix containing weights for respective clusters, a C matrix containing means for respective clusters; and an R matrix containing variances for respective clusters.

17. The article of claim 13, wherein executing the first SQL statement comprises executing the first SQL statement to produce output for a K-means clustering algorithm.

18. A method for use in a database system, comprising:

using a first Structured Query Language (SQL) statement to perform distance computation for a K-means clustering algorithm for k clusters applied on n data points, each data point having d dimensions, wherein k, n, and d are integers, and wherein k is user-defined;

executing the first SQL statement to cause update of an intermediate table having less than n·k·d rows, the intermediate table to store distance values computed by execution of the first SQL statement;

using the intermediate table to find nearest clusters for the data points;

computing sufficient statistics matrices N, M, and Q, wherein N contains numbers of points in corresponding clusters, M contains sums of points in corresponding clusters, and Q contains sums of square of points in corresponding clusters; and using the sufficient statistics matrices N, M, and Q to produce output for the clustering algorithm.

19. The method of claim 18, wherein updating the intermediate table comprises updating the intermediate table having n rows and k columns.

20. The method of claim 18, wherein using the first SQL statement to perform distance computation comprises using an SQL statement that outputs distance values for respective clusters in respective columns of the intermediate table.

21. The method of claim 18, further comprising executing a second SQL statement to find nearest clusters for the data points using the intermediate table.

22. The method of claim 21, wherein executing the second SQL statement is performed without performing a join.

* * * * *